TAPE REEL STORAGE SYSTEM

Filed Feb. 15, 1967

INVENTORS
FRANCIS S. FOOTE
THOMAS W. McCUNE

BY Gregg & Stidham
ATTORNEYS

INVENTORS
FRANCIS S. FOOTE
THOMAS W. McCUNE
BY Gregg & Stidham
ATTORNEYS

INVENTORS
FRANCIS S. FOOTE
THOMAS W. McCUNE

BY Gregg & Stidham
ATTORNEYS

United States Patent Office 3,442,394
Patented May 6, 1969

3,442,394

TAPE REEL STORAGE SYSTEM

Thomas W. McCune, San Francisco, and Francis S. Foote, Jr., Berkeley, Calif., assignors to Tab Products Co., San Francisco, Calif., a corporation of California Filed Feb. 15, 1967, Ser. No. 616,243
Int. Cl. A47g *29/00*
U.S. Cl. 211—40 11 Claims

ABSTRACT OF THE DISCLOSURE

Tape storage system wherein protective reel covers are supported side by side on a shelf with interlocking members on the covers and shelf holding the reel erect and in fixed position. The interlocking means are disposed within an area of the projection of the vertical cross-section of the reel cover for closer storage and maximum utility of space. Preferably, the storage rack comprises an array of spaced rods with a slide shoe having a rearward extension which engages between rear upright portions of the rods to interlock with them.

This invention relates to a tape reel storage system and, more particularly, to a system for storage of magnetic tape reels or the like providing means for positive location of reels and entailing a minimum of waste space.

With the increased use of computer tapes for the storage of data by business concerns, governmental agencies and a wide variety of organizations, there has been a concomitant growth of magnetic tape libraries. The growth has been so great in many instances that storage space has become an ever-increasing problem. As a result, a constant search is being made for systems capable of housing more reels in the assigned storage space. In the past, efforts have been directed largely toward the provision of tape reel covers or containers of reduced width, but even this has not provided a complete solution. Structural components which are required to position the reels in the storage racks have themselves required spacing of the reel containers in order to accommodate them. For example, in the past, tape storage reels have been generally stored in racks which are provided with side dividers of wire or the like between each reel to separate and support them, and these dividers themselves occupy valuable horizontal storage space. More recently, there evolved a system of hanging reels which enabled them to be suspended in virtually side by side engagement. However, this system, too, had numerous disadvantages, particularly in that the hook and the rod on which the reels were supported required additional vertical space. Moreover, the rod on which the hooks were suspended was necessarily disposed back from the front of the storage rack, with the result that the hook was difficult to engage and remove. In addition, the entire weight of the reel was concentrated at the hook and, where simple reel rim protectors were employed, the localized stresses often distorted the rim protectors. Further, there was no place at the forward portion of the storage cabinet for placement of labels to identify the proper storage position of the reels, and labels placed at a recessed position were not readily visible.

It is, therefore, an object of this invention to provide a tape reel storage system requiring a minimum amount of unused space, either laterally or vertically.

It is a further object of this invention to provide a system of tape reel storage providing a positive location for each individual storage reel.

It is a further object of this invention to provide a tape reel storage container which is self supporting on a table or the like in radially erect position.

It is a further object of this invention to provide a tape reel storage system wherein the reels are stored with gravity-produced stresses distributed over a wide area.

A still further object of this invention is to provide a tape reel storage system wherein reels may be stored in virtually side by side engagement but wherein the reels are readily identified from the front of the storage case and wherein the reels are readily removed.

In carrying out this invention, we provide a tape storage system wherein the protective reel covers are supported on a shelf with complementary interlocking members on the tape reel covers and the shelf which hold the cover erect and locate it positively in a fixed position along the width of the shelf. The interlocking component on the reel projects radially from the protective cover but does not extend beyond the width of the cover and little or no portion extends beyond the circumference of the cover except in the direction of interlocking engagement. In the preferred embodiment, the storage system takes the form of an array of wire rods which are supported on flat shelves to extend rearwardly and downwardly from front legs to enable placement of the reel cover by gravity. Preferably, the sliding engagement is accomplished by means of a shoe extending from the cover with a narrow portion of the shoe extending rearwardly to engage between portions of the rod which are bent upwardly toward the rear to hold the shoe and the storage cover in place.

Other objects and advantages of this invention will become apparent from the description following when read in conjunction with the accompanying drawings wherein.

Figures 1, 2, 3:
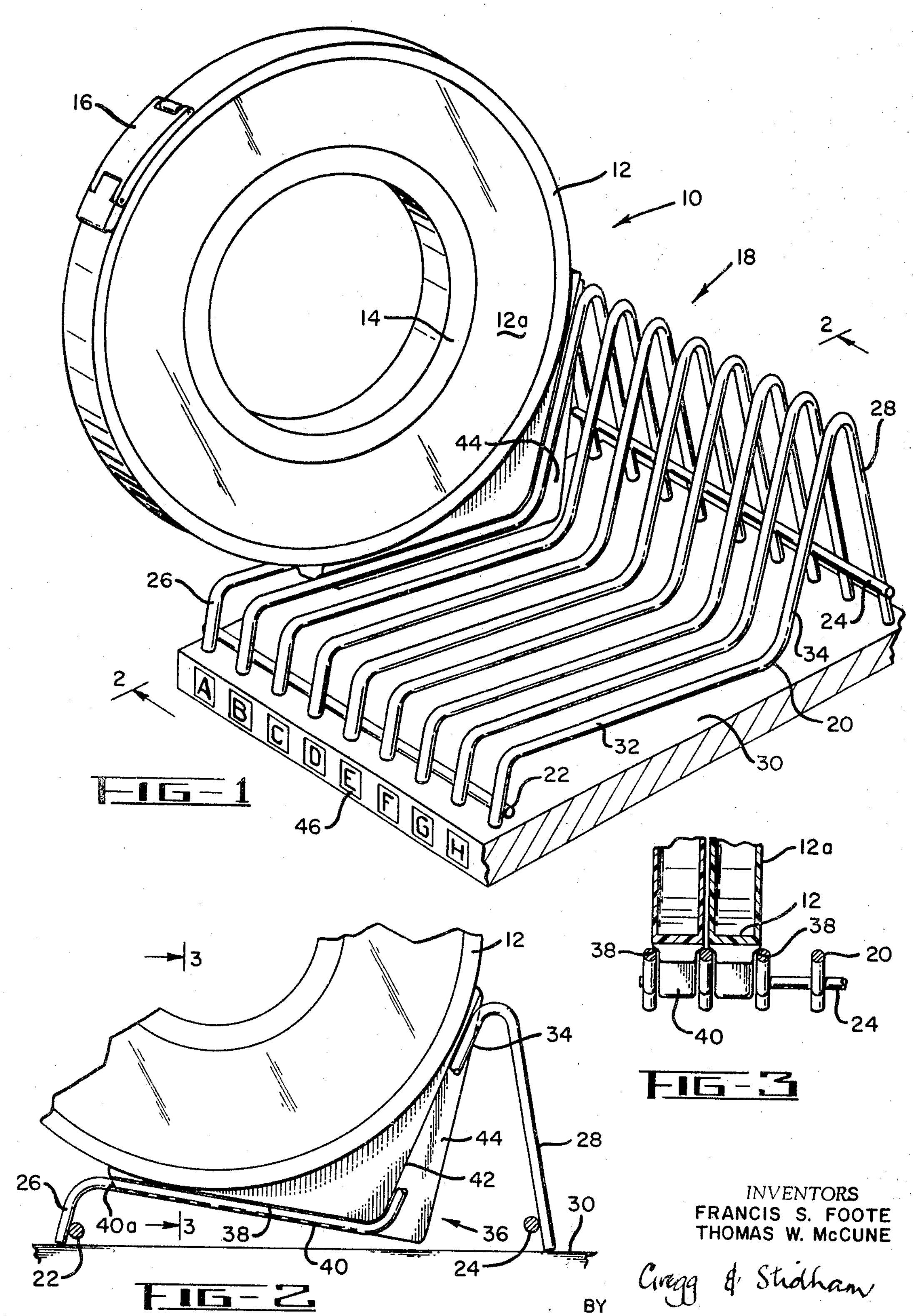
FIGURE 1 is a perspective view of a preferred embodiment of the invention.
FIGURE 2 is an enlarged section view taken along line 2—2 of FIGURE 1.
FIGURE 3 is a section view taken along line 3—3 of FIGURE 2.

Referring now to FIGURES 1, 2 and 3 with greater particularity, the tape reel and protective cover 10 may take the form of a peripheral sealing band 12 with partial side covers 12*a*. The band 12 seals around the open rim of a tape reel 14 with a suitable latch mechanism 16 being provided to secure the cover 12 firmly under slight loop tension to insure sealing. However, it is also to be understood that the particular configuration of the protective cover per se is not a limitation of this invention, and our storage system is applicable to a wide variety of covers, including complete enclosures or canisters.

The preferred embodiment of our storage system takes the form of a rack 18 formed by a series of wire rods 20 which are secured together in parallel, spaced relationship as by securing them to forward and rear cross wires 22 and 24. Each of the wires 20 has front and rear downwardly extending portions 26 and 28 forming legs for supporting the rack 18 on a suitable shelf 30. The underlying portions 32 of the wires together form a shelf-like support surface and are preferably inclined downward toward the rear so that adjacent wires form a slideway wherein the tape reels 10 may be placed by gravity, as hereinafter will be described. The rear portion of the rack 34 extends upwardly to form a back stop and interlock component, also to be described.

Carried on each of the protective reel covers 12, as by integral molding, bonding or by any other suitable means, is a shoe 36 which may be of generally triangular configuration extending from one quadrant of the circular cover 12. As shown most clearly in FIGURE 3, each shoe is recessed at 38 along both lower edges to provide a narrower slide portion 40 of a width to extend between adjacent rods 20. Thus, the surfaces of the recesses 38 slide along a pair of adjacent rods 20 with the narrow portion 40 of the shoe 36 engaging between the rods of the slideway to guide the reel into place. The shoe may be inserted into its slideway from the front of the rack and moved back along the downwardly inclined portion 32 by gravity to a position of rest defined by the upright rod portion 34. The rear portion of the shoe is similarly recessed at 42 along both sides to form a narrow interlock portion 44 which is adapted to extend between adjacent upright portions 34 of the wire rods 20. It is noted that the narrow portion 44 is of sufficient width that a substantial portion of the shoe will extend between the rods and provide a positive interlock which is sufficient to support the reel and cover 10 in radially erect position.

Referring specifically to FIGURE 3, it will be noted that the recesses 38 and 42 are of substantially the same diameter as that of the rod and extend close to the vertical centerline of the rod. Hence, as shown, each rod 20 can accommodate the adjacent recesses of two slides 40 in very closely spaced relationship. In addition, the legs 26 and 28 of the rack are kept to a minimum height so that the interlocking portion 44 just barely clears the surface of the shelves 30, thus minimizing the vertical space requirement of the system. With the rack 18 being placed on a shelf 30 identifying indicia 46 may be applied to the front of the shelf 30 or the rack 18 itself. Such indicia are clearly visible from the front and greatly facilitate location of the desired reels 10.

The latch 16 or any other suitable protuberance on the forward surface of the protective cover 12 facilitates removal of the reel and cover 10 even though they are closely packed. When it is desired to remove a reel and cover 10, a slight downward force against the latch 16 causes the reel 10 to pivot above the forward edge 40a of the slide 40 and the reel 10 is thereby pulled outward in advance of adjacent reels. In this position, the reel may readily be grasped for removal.

As an additional feature of this invention, the bottom surface 40 is preferably of sufficient width and length that the reel and protective cover 10 may be supported on a table when the reel 10 is removed from the rack 18.

Figure 4:
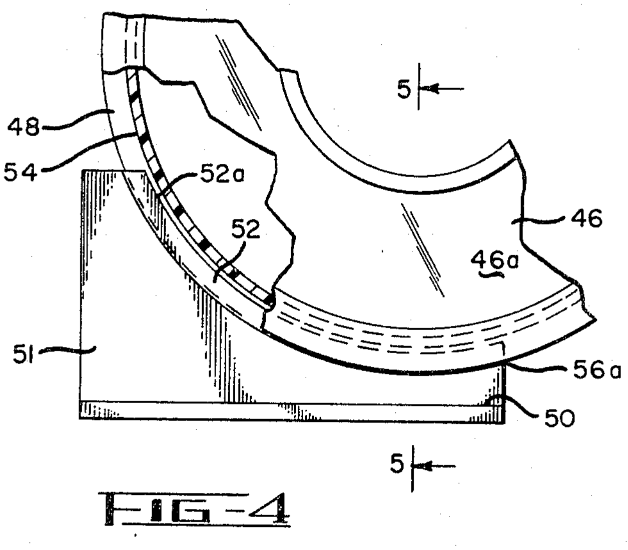
FIGURE 4 is a partial plan view, partially in section, of another embodiment of this invention.
Figure 5:
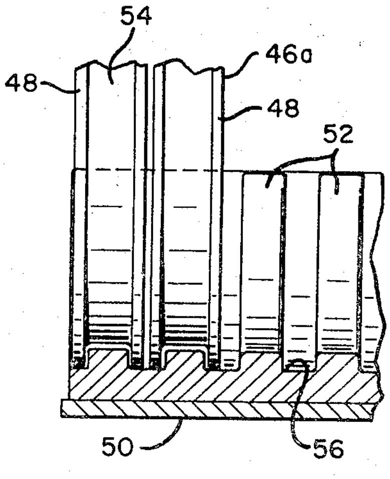
FIGURE 5 is a section view taken along line 5—5 of FIGURE 4.

Referring now to FIGURES 4 and 5, I have illustrated another embodiment of my invention wherein the tape reel cover, such as a canister 46 is provided with a pair of radial flanges 48 which may be formed simply by extending the sides 46a of the canister. Then, the tape storage shelf 50 is provided with a mounting back 51, including a series of arcuate protrusions 52 which have a concave, cylindrical upper surface 52a of a curvature conforming to the curvature of the canister edge 54 intermediate the flanges 48. The protrusions 52 are of a width slightly less than that of the space between the flanges 48 so as to nest between the flanges and support the canister in radially upright position. The slots 56 intermediate the protrusion are of a width to accommodate two flanges as shown with a minimum amount of space between them. Again, when it is desired to remove a canister 46, one needs merely to pull downward by grasping any suitable means (not shown) and the canister will tend to pivot about the leading edge 56a of the slot portion in which they are accommodated and rock forward to extend ahead of adjacent canister.

Figure 6:
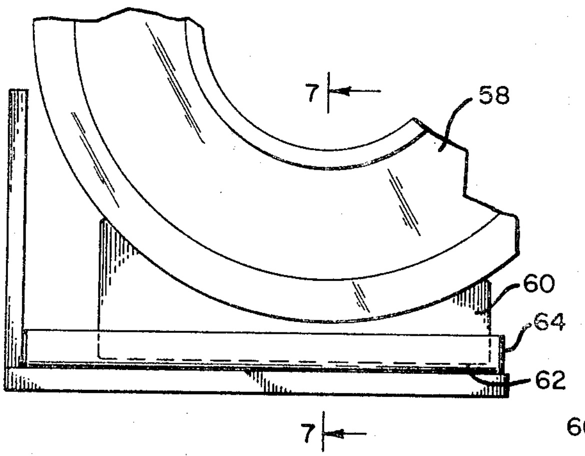
FIGURE 6 is a partial plan view of another embodiment of this invention.
Figure 7:
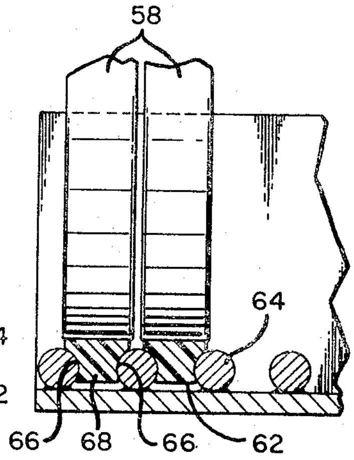
FIGURE 7 is a section view taken along line 7—7 of FIGURE 6.

In FIGURES 6 and 7, the canister 58 has a depending slide 60 which is provided with a flat bottom 62 for sliding movement along adjacent pairs of horizontal rods 64. As shown in FIGURE 7, the slide 50 is provided with an arcuate recess along each edge to accommodate the surface of adjacent circular rods 64. Preferably, the arcuate recesses are sufficient arcuate lengths that the interlock 68 extends below the horizontal center line of the circular rod 64 so as to preclude removal of the canister 58 other than by sliding forward on the rods 64. As in the embodiments of FIGURES 1 and 4, the surfaces of the rod 64 form a shelf-like surface and the spaces between them form slots for engagement with the interlocking protrusion 68.

Figure 8:
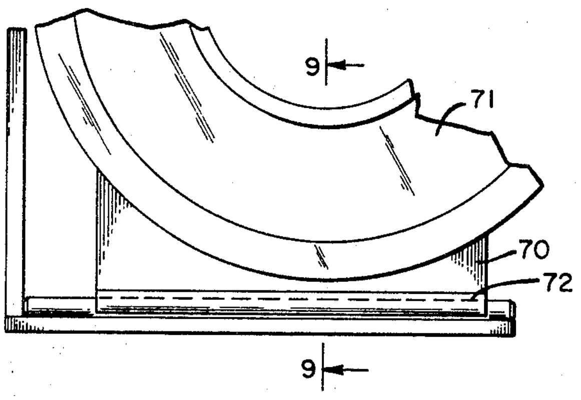
FIGURE 8 is a partial plan view of another embodiment of this invention.
Figure 9:
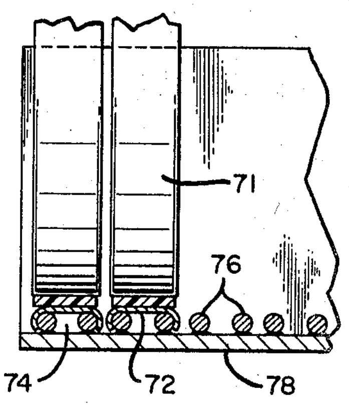
FIGURE 9 is a section view taken along line 9—9 of FIGURE 8.

In FIGURES 8 and 9, a similar depending slide 70 is formed at the lower end thereof with channel members 72 which, as shown in FIGURE 9, engage and slide along on accommodating slide way 74 which may be formed by securing pairs of rods 76 to the supporting base 78.

Figures 10, 11:
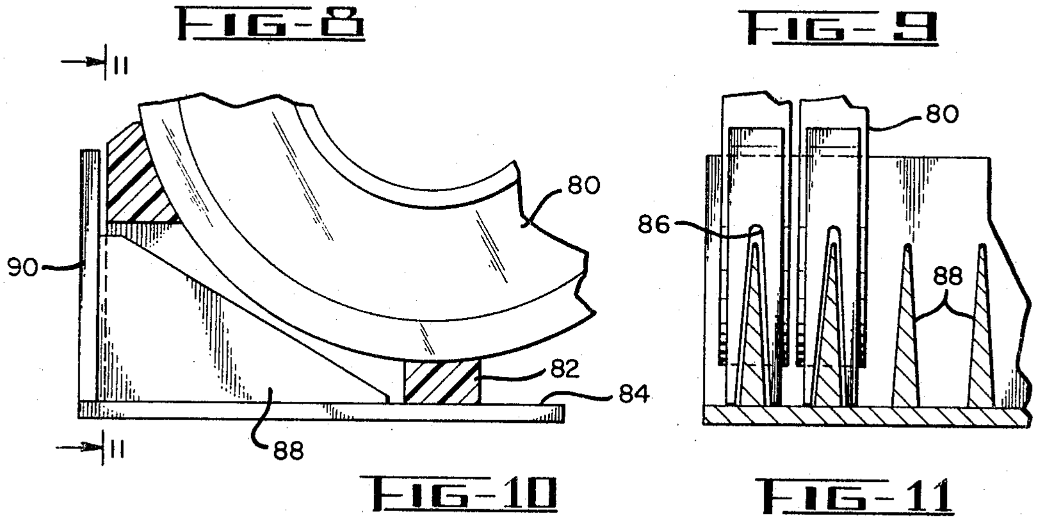
FIGURE 10 is a partial plan view of still another embodiment of this invention.
FIGURE 11 is a section view taken along line 11—11 of FIGURE 10.

In FIGURES 10 and 11, an extension from the canister 80 has an extension 82 which extends downwardly and rearwardly to provide a base of substantial area to support the canister 80 upright on a supporting surface 84. In addition, the extension 82 is provided with a rearwardly opening tapered slot 86 which is adapted to accommodate a complementary tapered extension 88 extending forwardly from the rear panel 90 to provide a positive interlock which holds the canister erect and locates it positively on the supporting shelf 84.

Figures 12, 13:
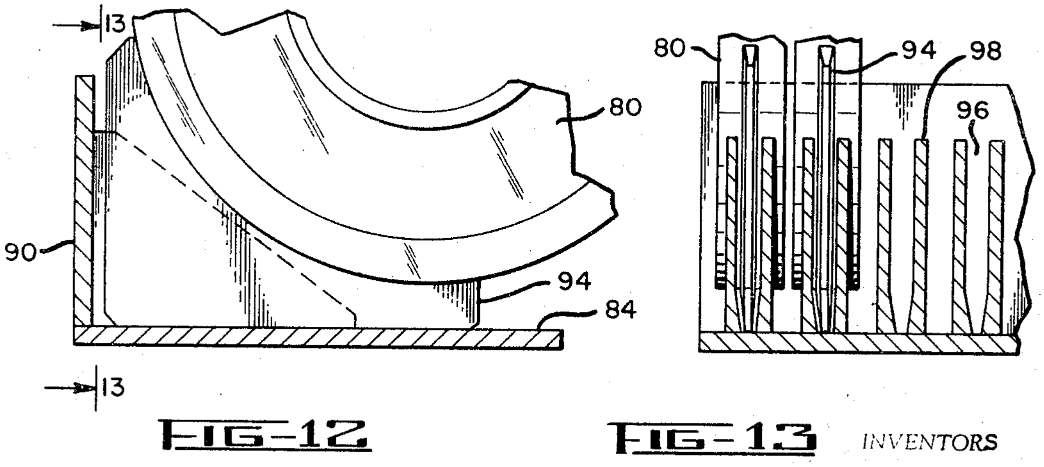
FIGURE 12 is a partial plan view of still another embodiment of this invention.
FIGURE 13 is a section view taken along line 13—13 of FIGURE 12.

In FIGURES 12 and 13 the extension 94 comprises a male member and, as shown in FIGURE 13, is tapered to a narrow configuration at the rear to facilitate insertion into the complementary groove 96 which is provided in an extension 98 secured to the back panel 90 of the shelf 84.

While this invention has been described in conjunction with preferred embodiments thereof, it is obvious that modifications and changes therein may be made by those skilled in the art without departing from the spirit and scope of this invention as defined by the claims appended hereto.

Having described our invention, we claim:

1. A system for storing tape reels comprising:

a plurality of protective cover members adapted to embrace and span the open periphery of a tape reel, a shelf-like support member adapted to receive said cover member, and complementary interlocking means on said members substantially confined to the area formed by a projection of a transverse cross-section of said cover member for holding said cover members radially erect and against axial movement, said support member comprising means forming adjacent, underlying and generally upright surfaces, and said complementary interlock means comprising:

means forming a plurality of slots in each of said surfaces, and rearward and downward protuberances on each of said covers adapted to be received snugly in one of said slots each of said protuberances being narrower than the width of said cover so that said cover is supported on said surfaces while said protuberances are received in said slots.

2. The system defined by claim 1 wherein:

said surfaces are formed by a plurality of generally L-shaped rods secured together in parallel relationship forming an array thereof with the spaces therebetween forming said slots.

3. The system defined by claim 2 including:

downward extensions at opposite ends of at least some of said rods forming legs for supporting said array of rods on a flat surface with said underlying surface inclined downward from the forward portion thereof.

4. The system defined by claim 2 including:

a generally triangular shoe extending radially from said cover member, said shoe being recessed to a narrower width along the extended sides thereof to form said protuberances, and the inwardly disposed walls of said recessed portions being adapted to engage and be supported on said rods.

5. The system defined by claim 4 wherein:

at least one side of said triangular shoe is of sufficient length and width between said recesses to support said cover member in upright position on a flat surface.

6. The system defined by claim 5 wherein:

said tongue and groove are of complementary wedge shape configuration increasing in width toward the rear to facilitate engagement thereof from the front of said support surface.

7. A system for storing tape reels comprising:

a plurality of protective cover members adapted to embrace and span the open periphery of a tape reel, a shelf-like support member adapted to receive said cover members, and complementary interlocking means on said members, each substantially confined to the area formed by a projection of a transverse cross-section of one of said cover members for holding said cover members radially erect and against axial movement, said support member comprising a generally flat surface and a generally upright rear wall portion, and said interlocking means comprising:

a shoe having downward and rearward extending portions carried on each of said cover members, said downward extending portion having a generally flat bottom surface to support said cover member in radially erect position on said surface, means forming a groove in one of said upright wall and said rearward extending portions, and means forming a complementary protruding tongue in the other of said portions.

8. A system for storing tape reels comprising:

a plurality of protective cover members adapted to embrace and span the open periphery of a tape reel, a shelf-like support member adapted to receive said cover members, and complementary interlocking means on said members substantially confined to the area formed by a projection of a transverse cross-section of one of said cover members for holding said cover members radially erect and against axial movement, each of said complementary interlocking means comprising:

an extension on one of said cover members and said support members having an outer surface engageable with and conforming to the profile of the outer surface of said other member, one of said outer surfaces having spaced flanges extending therefrom and the other of said outer surfaces having a complementary extension adapted to fit snugly between said flanges.

9. The system defined by claim 8 wherein:

said flanges extend from the periphery of the cover to form continuations of the sides thereof, said extension being carried on said support member and having a concave cylindrical surface conforming to the curvature of a cylindrical cover.

10. A system for storing tape reels comprising:

a plurality of protective cover members adapted to embrace and span the open periphery of a tape reel, a shelf-like support member adapted to receive said cover members, and complementary interlocking means on said members substantially confined to the area formed by a projection of a transverse cross-section of one of said cover members for holding said cover members radially erect and against axial movement, each of said complementary interlocking means comprising:

a downward extension on said cover having a generally horizontal lower surface, a series of generally horizontal rods of circular cross-section forming a slideway on said support member, and complementary arcuate recesses along the lower edges of said downward extension forming a slide.

11. The system defined by claim 10 wherein:

said arcuate recesses, when said downward extension is viewed in vertical section, conform to the circular cross-section of said rods through an arc extending below the horizontal centerlines of said rods.

References Cited

UNITED STATES PATENTS

| | | | |
|---|---|---|---|
| 1,429,076 | 9/1922 | Helsley | 312—12 |
| 3,051,537 | 8/1962 | Diehl | 312—12 |
| 3,298,530 | 1/1967 | Clouther | 211—40 |
| 3,338,421 | 7/1967 | Lyman | 312—10 |

FOREIGN PATENTS

| | | |
|---|---|---|
| 170,236 | 10/1921 | Great Britain. |
| 829,229 | 3/1960 | Great Britain. |

CHANCELLOR E. HARRIS, *Primary Examiner.*

U.S. Cl. X.R.

206—52; 312—20, 234.2